Oct. 15, 1929.    J. W. STARNES    1,731,730
DRAFT HITCH
Filed April 7, 1928
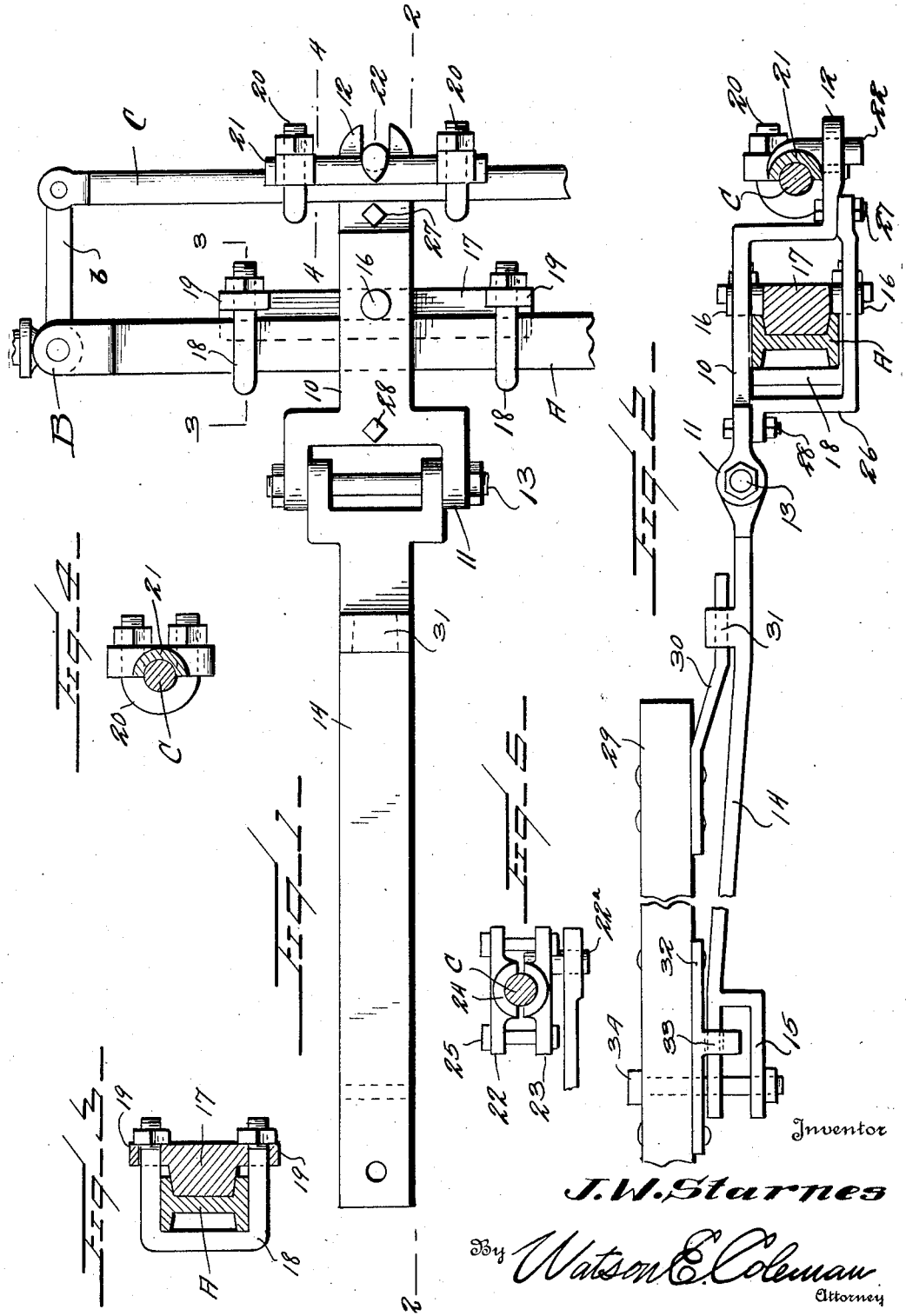
Inventor
J. W. Starnes
By Watson E. Coleman
Attorney Patented Oct. 15, 1929.

1,731,730

UNITED STATES PATENT OFFICE

JOHN W. STARNES, OF HARROLD, TEXAS

DRAFT HITCH

Application filed April 7, 1928. Serial No. 268,270.

This invention relates to hitches for towing vehicles, and the general object of the invention is to provide a hitch whereby a vehicle may be towed either by motor or by horses.

A further object is to provide a hitch of this character which can be readily attached to a trailer or a motor vehicle, and which is so constructed that it will permit, for instance, a farmer whose trailer or vehicle has become bogged in a field to draw the vehicle from the field by means of horses and then connect the towed vehicle to a motor vehicle.

Another object is to provide a device of this character which may be readily applied and readily removed, which may be made to fit a large variety of different makes of motor vehicles and trailers, which is simple in construction, and which will cause the towed vehicle to trail properly.

My invention is illustrated in the accompanying drawing, wherein:—

Figure 1 is a top plan view of a hitch constructed in accordance with my invention and showing a portion of the axle of the towed vehicle;

Figure 2 is a section on the line 2—2 of Figure 1;

Figure 3 is a section on the line 3—3 of Figure 1;

Figure 4 is a section on the line 4—4 of Figure 1;

Figure 5 is a sectional view through the shaft C showing a modification of the pin supporting means.

Referring to the drawing, A designates the axle of a towed vehicle to which my hitch is adapted to be applied. This axle is shown as being provided with the usual knuckles B upon which the steering wheels of the vehicle are mounted having the usual rearwardly extending arms *b* connected by the steering rod C.

My attachment comprises a lever 10 adapted to be disposed either above or below the axle A, this lever having a forked forward end 11 in which the fork is relatively wide, and a forked or bifurcated rear end 12. Both these forks or bifurcations are disposed in a horizontal plane. Passing through the fork 11 is a bolt 13 to which a hitching arm 14 is connected, this hitching arm being forked at its rear end and being disposed between the forks 11 and the bolt 13 passing through it so that this hitching arm may have vertical movement.

The hitching arm at its forward end is provided with a depending flange or lug 15 for a purpose to be later stated. The lever 10 is pivoted upon a projecting pin 16, and disposed against the front axle A is a block 17 which supports the pin and acts to pivotally support the steering lever. This block is held in place by means of U-bolts 18 which engage lugs 19 on the block and extend around the axle.

Held to the steering rod C by means of U-bolts 20 is a block 21 having a pin 22 which engages in the slotted rear end or rear fork 12 of the lever.

In Figure 5, I illustrate a modification of the manner of mounting the pin upon the steering rod, in which two clamping members 22 and 23 are provided formed with semi-circular seats 24 for the steering rod, these members being urged toward each other by bolts 25 and the member 23 carrying the pin 22ª.

It will be seen from Figure 1 that the lever 10 extends over the axle A and then downward and then rearward and that an angular section 26 extends beneath the axle and is held to the rear end of the lever by means of the bolt 27 and to the forward end of the lever by means of the bolt 28.

Used in conjunction with the hitching arm 14 is a tongue 29. Attached to the rear end of this tongue is a depressed tongue iron 30 adapted, when the tongue is used, to be inserted through a loop 31 formed on the hitching arm 14. Attached to the tongue 29 forward of the iron 30 is a plate 32 formed with a loop 33 through which the forward end of the hitching iron 14 extends. The forward end of the iron 14 and the forward end of the flange 15 are perforated, and passing through the tongue 29 and through these perforations is a bolt 34. It will be seen that by removing the bolt 34, the tongue 29 is readily detached from its engagement with the hitching arm 14 and that the tongue is as readily engaged with this hitching arm. The hitching arm 14 provides means whereby my improved hitch may be connected to a tractor, an automobile or other motor vehicle.

The tongue 29 provides means whereby the hitch may be connected to a horse-drawn draft appliance, the tongue 29 being particularly constructed for this purpose. This device makes it possible for a farmer to attach the hitch to a chassis in a very few minutes, and if his vehicle happens to be in his field loaded and the field is too muddy to run a car to the loaded vehicle to draw it out, the tongue 29 may be readily applied, the team can be hitched up to this tongue, and the trailer or vehicle can be moved out into the road where it can be hitched to the car. Obviously, one may buy this appliance either with the tongue 29 or without the tongue, and equally obviously the device may be manufactured at a very moderate cost.

While I have illustrated a block 17 which is so formed as to particularly fit in the I-beam, which in many cars constitutes the front axle, it will be obvious that this block may be changed in shape to conform to any shaped axle, and it will be understood that such a modification is within the purview of this invention. There are no grease cups, oil holes or other devices for lubricating the working parts, inasmuch as this device needs no grease, which will eliminate a dirty and greasy hitch. The tongue 29, when attached, is on a level with the chassis body so that the trailer or other vehicle being pulled is capable of being drawn by a team. The bolt 34 may be in the form of a pin and is used to attach the trailer to the motor vehicle or the team tongue 29 to the trailer hitch. It is to be particularly noted that provision is made at the forked end of the hitching arm 14 for clearance enough to take care of the twist which might be given to the trailer or vehicle on rough roads.

While I have illustrated certain details of construction and arrangement of parts, I do not wish to be limited to this as it is obvious that these might be varied in many ways without departing from the spirit of the invention as defined in the appended claims.

I claim:—

1. A trailer hitch of the character described comprising a block adapted to be disposed behind the axle of a motor vehicle, the block having upwardly and downwardly projecting pins and having means whereby it may be clamped to the axle, a lever pivotally mounted upon the pins and adapted to embrace the axle of the vehicle, the forward end of the lever being bifurcated and the lever being formed to extend above and below the axle, a hitching arm pivotally connected with the bifurcated end of the lever for movement in a vertical plane and having an upwardly projecting loop upon its upper face and at its forward end having an angular flange, the forward end of the tongue and the flange being perforated, and a draft tongue having an angularly disposed iron at its rear end, one end of which is adapted to be slipped beneath said loop, the tongue forward of this last named iron having a depending loop through which the forward end of the hitching arm is adapted to pass, and a pin extending through the tongue and through the forward end of the hitching arm and its flange.

2. In a trailer hitch of the character described, an axle engaging structure, a hitching arm pivotally connected to said structure for movement in a vertical plane and having an upwardly projecting loop upon its upper face extending transversely of the length of the arm, the forward end of the arm being perforated, and a draft tongue having an angularly disposed iron at its rear end, one end of which is adapted to be slipped beneath said loop, the tongue of this last named iron having a depending loop through which the forward end of the hitching arm is adapted to pass, and a pin extending through the tongue and through the forward end of the hitching arm.

In testimony whereof I hereunto affix my signature.

JOHN W. STARNES.